Nov. 21, 1939.  L. V. LUCIA  2,181,090
AUTOMATIC CONTROL FOR COFFEE MAKERS
Filed Nov. 4, 1936
Fig.1.
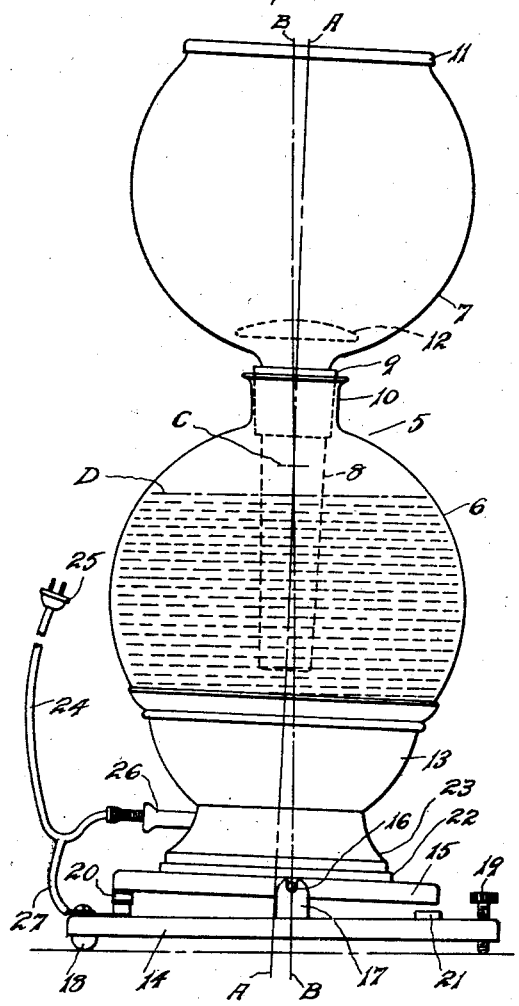
Fig.2.
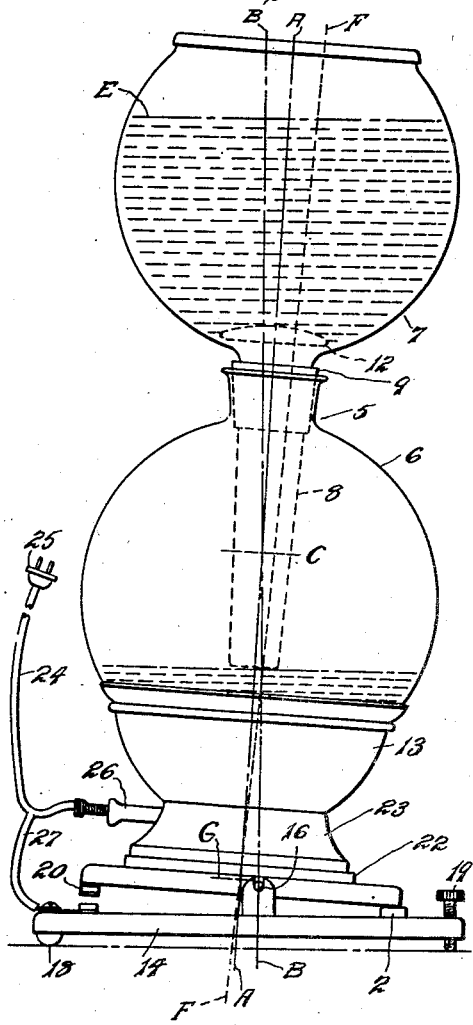
Fig.3.
Fig.4.
Fig.5.
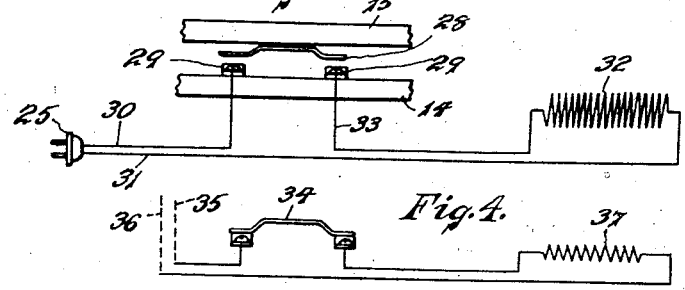
INVENTOR.
Louis V. Lucia Patented Nov. 21, 1939

2,181,090

UNITED STATES PATENT OFFICE 2,181,090

AUTOMATIC CONTROL FOR COFFEE MAKERS

Louis V. Lucia, West Hartford, Conn., assignor to The Silex Company, Hartford, Conn., a corporation of Connecticut Application November 4, 1936, Serial No. 109,087

9 Claims. (Cl. 219—43)

This invention relates to automatic controls for coffee makers and, particularly, for that type of coffee makers which consist of an upper and lower bowl.

Coffee makers of this type are usually made of glass. The upper bowl is provided with a depending hollow stem which extends into the lower bowl to a point slightly above the bottom thereof.

In the use of said coffee makers, water is first placed in the lower bowl to the proper height and coffee grounds are placed in the upper bowl. The said upper bowl is then placed upon the top of the lower bowl with the stem extending downwardly to a point slightly above the bottom of the said lower bowl. The coffee maker is then set upon a suitable source of heat and operates as follows: As the water in the lower bowl is heated, pressure is formed therein, forcing the water upwardly through the stem and into the upper bowl until the level of the water in the lower bowl reaches a point below the bottom of the said stem. The water at this time is mixed with the coffee grounds in the upper bowl thus making coffee.

The source of heat is then cut off and, as the air in the lower bowl cools off, the pressure therein is reduced and a vacuum is formed which draws the water, now coffee, from the upper bowl back into the lower bowl and leaving the coffee grounds in the upper bowl.

It will be understood from the above description that in order to cause the water from the upper bowl to be drawn back into the lower bowl it is necessary that the source of heat be cut off, otherwise, the air pressure in the lower bowl would not be reduced and the water would be held in the upper bowl as long as heat is supplied.

Due to the scientific principle involved in the operation of said coffee makers, it is difficult for those not skilled in the art to understand their operation. It is, therefore, highly desirable that the operation of the coffee makers be demonstrated by some automatic means so that the coffee makers could be put on display and kept in continuous operation for observation thereof by the public.

It has been found, by exhaustive tests, that the best coffee is made when the grounds are immersed in water which is just below the boiling point and immersed therein only once, as the second immersion usually draws caffeine or other undesirable elements from the coffee. In view of this, it is also highly desirable that a device be provided which will act as an automatic shut-off for the heat source so that the coffee maker could be set for operation and, when the water has been forced into the upper bowl, the heat would be automatically shut off and not go on again until again set by the operator.

The primary object of my invention therefore, is to provide a device which can be used for demonstrating the operation of the above described type of coffee makers.

A further object is to provide such a device which, when desired, can be used as an automatic shut-off and for properly controlling the operation of said coffee makers.

A further object is to provide such a device which is simple in construction, easy to operate and economical to produce.

A still further object of my invention is to provide such a device which, by the addition of a separate element, may be operated to automatically lower the amount of heat supplied by the heat source to a point where the water will be drawn back into the lower bowl but still be supplied with a small amount of heat for keeping the finished coffee warm.

My invention is clearly illustrated in the accompanying drawing in which:

Figure 1 is a view in side elevation illustrating my invention.

Figure 2 is a similar view illustrating the operation of my invention.

Figure 3 is a diagrammatic view illustrating the manner in which the heat source is automatically controlled.

Figure 4 is a similar view illustrating a modification of my invention to include an additional element thereof.

Figure 5 is a diagrammatic view illustrating a further modification.

As illustrated in the drawing, the numeral 5 denotes a coffee maker comprising a lower bowl 6 and an upper bowl 7, which are preferably of heat resisting glass.

The said upper bowl has a depending stem 8 which extends into the lower bowl. A tapered collar 9 of rubber or other suitable material surrounds the said sleeve and forms an air tight cushion to support the upper bowl in the neck 10 of the lower bowl.

A cover 11 may be placed upon the upper bowl if desired and a screen 12 may also be used to support the coffee grounds in the upper bowl.

In the form illustrated, the said coffee maker is mounted upon an electric heater 13 which supplies heat for the operation of the coffee maker.

In order to attain the objects of my invention, I provide a base 14 on which is pivotally mounted a sub-base 15; the said sub-base being provided with a shaft or pin 16 which is pivoted in a support 17 that extends upwardly from the base 14.

The said base is provided with feet 18 at one side thereof and an adjusting screw 19 at the opposite side whereby the sub-base may be adjusted to the proper angle for the operation of the device.

The sub-base is provided at one side with an electric switch 20 which is adapted to close or open an electrical circuit that supplies heat to the heater 13. A stop 21 may be provided to engage the opposite side of the sub-base if desired although the same is not necessary.

In the form shown, I also provide a receptacle 22 which is secured to the sub-base, in the proper position thereon, for receiving and retaining in position, the base 23 of the heater 13.

Electric energy is supplied to the heater by means of a cord 24 having an attachment plug 25 at the end thereof which is insertable in an electrical outlet. The said cord is provided with a heater plug 26 that is attached to electrical connecting means in the heater. An extension 27 is provided on said cord for connecting the same to the switch 20. The said switch consists of a bar 28, which is mounted at one side of the sub-base 15, and contacts 29—29 that are mounted upon the base directly under the said bar 28. One of the wires 30, which is contained within the cord 24, extends to one of the said contacts 29. The other wire 31 extends directly to the resistance coil 32, which is contained within the heater, and a separate wire 33 extends from the other contact 29 to said resistance coil 32 thus connecting the switch 20 in the electrical circuit in series with said resistance coil.

The operation of my invention is as follows:

It will be noted that the sub-base 15 is inclined in such a manner that the coffee maker is supported thereon with its axis, denoted by line A—A, slightly off the vertical and, so that it crosses the line B—B denoting the center of gravity, at a suitable point such, as indicated at C, which is more effective above the level D of the water in the lower bowl.

When the operation of the coffee maker is started, the same is in its normal position as illustrated in Figure 1 of the drawing. In this position the weight of the water, being in the lower bowl, is on that side of the axis A—A which tends to rock the sub-base 15 so that it will close the switch 20. This will cause energization of the resistance coil 32 which will heat the water in the lower bowl 6.

As this water becomes heated, the expansion of air in the lower bowl will force the water upwardly, through the stem 8, into the upper bowl until the level of the said water is below the stem. At this time the water reaches the level E in the upper bowl as clearly illustrated in Figure 2.

As the water is transferred from the lower into the upper bowl, the weight thereof is shifted from the lower part of the axis A—A, which is at one side of the center line of gravity B—B, to the upper part of the said axis, which is at the opposite side of said center line of gravity, thus causing a tilting action of the sub-base 15 to the position clearly illustrated in Figure 2 whereby the switch 20 is opened; thus breaking the electrical circuit and shutting off the heat which is generated by the resistance 32 in the heater 13.

As the heat is shut off and the air in the lower bowl is cooled, a vacuum is formed in said lower bowl which will draw the water from the upper bowl back into the lower bowl as finished coffee and leave the coffee grounds in the upper bowl. Upon the water re-entering into the lower bowl, the weight thereof is again shifted back to the opposite side of the center line of gravity, and in the position illustrated in Figure 1, causing the sub-base 15 to tilt to its normal position and thereby closing the electrical switch 20 and again energizing the resistance 32; thus repeating the operation.

The operation, as just described, is only for the purpose of demonstrating the operation of the coffee maker.

If it should be desired to use my device as an automatic shut-off, the base 14 is adjusted, by means of the screw 19, so that the axis of the coffee maker will be tilted to a greater extent than above described and to such an extent that, when the water is in the upper bowl and the weight thereof is transferred to the opposite side of the center line of gravity B—B, the axis will tilt to the position indicated by dotted lines F—F. In this position the said axis cannot be returned to their normal point when the water is returned to the lower bowl, for the reason that the fulcrum of said axis on the center line of gravity B—B will have been transferred to the point indicated at G which is sufficiently low to prevent the weight of the water in the lower bowl from overcoming the weight of the upper bowl, even when empty, on account of the same being at a greater distance to the opposite side of the center line of gravity.

As illustrated in the modification shown in Figure 4 of the drawing, I may provide; if desired, a separate electric switch 34 which can be mounted at the opposite side of the sub-base 15, and in the position occupied by the stop 21, so that when my device is to be used as an automatic shut-off, the operation thereof at the completion of the coffee making cycle of operation will cause the said switch to close the circuit extending from the wires 30 and 31 through connecting wires 35 and 36, shown in dotted lines, to an auxiliary resistance coil 37 which will provide a suitable amount of heat to keep the coffee in the lower bowl warm and still not provide heat enough to cause sufficient expansion of the air in the lower bowl to return the water from the lower bowl to the upper bowl and thus repeat the coffee making operation.

It may also be desirable, in some cases, to provide safety means which will operate to permanently shut off the heat in the event that the water in the coffee maker has been allowed to evaporate, by continuous heating during the demonstration operation, to a point where there is such a little amount of water left that either its weight will not be sufficient to operate the automatic device above described or the said water has entirely evaporated, in which case it is important that the heat be shut off in order to prevent damage to the coffee maker and heating means and even preventing the possibility of fire.

I, therefore, may provide an extra switch which is operated by gravity such as illustrated in the modification shown in Figure 5 of the drawing. The conductor wire 30 is cut and a switch 39 is provided which may be in the form of a light spring adapted to be operated by the weight of the water in the coffee maker, indicated by the arrow 40, which may be applied upon said spring through the sub-base 15. Thus, when sufficient water is contained within the coffee maker to cause proper operation thereof, the weight of said water will force down the spring 39 into engagement with the contact member 38. Should the water in the coffee maker be allowed to evaporate to a point below the amount required to provide the necessary weight for operating the device, the reduction, or elimination, of the weight of the water, represented at 40, will permit the spring 39 to move upwardly, lifting the sub-base 15 and breaking the contact between said spring and contact member 38 thus breaking the electrical circuit and preventing restoration of heat until the coffee maker has again been replenished with a sufficient amount of water.

The results above described will also be attained, although to a less positive extent, by the operation of the device as illustrated in Figures 1 and 2, wherein, when the water has been reduced to a low point, the weight of the upper bowl at one side of the center line of gravity is greater than the weight of the lower bowl combined with the weight of the small amount of water left therein so that tilting of the sub-base is thereby prevented.

While I have illustrated and described one form of a device by which the objects of my invention may be attained, it is to be understood that the said device may take various other forms and that, by suitable connections, it may also be made to operate an electric switch of the mercury type instead of the type of switch shown and described herein.

I claim:

1. In combination a lower bowl, an upper bowl, mounted upon said lower bowl, heating means whereby liquid in the said lower bowl is heated and caused to be transferred into the said upper bowl, a movable member adapted to support said bowls substantially in vertical position thereon and to be operated by the shifting of the weight of said liquid from one of said bowls to the other and an electric switch separate from said bowls and operable by said movable member to control the operation of said heating means.

2. The combination of a lower bowl, an upper bowl, a heater whereby liquid is caused to be transferred from one of said bowls to the other, a base, a member supporting said bowls and movably mounted on said base to move thereon upon a center line of gravity, an electric switch separate from said bowls and associated with said member and adapted to be operated thereby for controlling the supply of heat to said heater, and means for positioning the said member to cause the weight of said liquid when contained in the lower bowl to be at one side of said center line of gravity and when in the upper bowl to be at the opposite side of said line of gravity to cause movement of said member and thereby operate said switch.

3. The combination of a lower and an upper bowl in which the weight of a liquid is adapted to be transferred from one of the said bowls to the other, a source of heat for causing the transfer of said liquid, a support for said coffee maker comprising a movable member upon which said bowls and source of heat are mounted and which is adapted to be operated by the shifting of the weight of said liquid from one side of a center line of gravity to the opposite side thereof and means separate from said bowls and associated with said movable member for controlling the operation of said source of heat.

4. A device for automatically controlling the operation of a coffee maker comprising a lower and an upper bowl in which a liquid is adapted to be transferred from one of said bowls to the other, the said device comprising a base, a movable member separate from said coffee maker and adapted to support the same on said base, a heater supported on said movable member and upon which is mounted the said coffee maker, an electric switch separate from said bowls and operable by said movable member for controlling the operation of said source of heat; said movable member being pivotally mounted on said base and the said coffee maker being supported thereon at one side of a center line of gravity extending through the pivotal point between said movable member and base and the said coffee maker being disposed with its axis extending substantially vertical and crossing the said center line of gravity whereby the weight of said liquid is adapted to be moved from one side of said center line of gravity to the opposite side thereof when the same is transferred from one of said bowls to the other and thereby cause operation of said movable member.

5. A device of the character described comprising the combination of a base, a tiltable member comprising positioning means mounted on said base, an electric heater mounted on said base and positioned by positioning means, a glass coffee maker comprising a lower bowl mounted on said heater and an upper bowl mounted on said lower bowl, an electric switch operable by said tiltable member, an electric supply cord having an attachment plug thereon connected in series with said electric switch and adapted to be connected to said heater; the said tiltable member being disposed to support said coffee maker at an angle, whereby the weight of a liquid in the said lower bowl will tilt the said member to close said switch and thereby energize said heater, whereupon the heat therefrom will transfer the said liquid to the upper bowl wherein the weight of said water will shift the said tiltable member to the opposite side, thus opening said switch and deenergizing the said heater and causing the said water to be again returned to the lower bowl and tilting the said tiltable member to close said switch and repeat the operation of transferring the water from the lower bowl to the upper bowl of the coffee maker.

6. In a device of the character described, the combination of a coffee maker support comprising a base, a tiltable member mounted on said base, an electric heater mounted on said tiltable member in laterally fixed position thereon, an electric circuit connected to said heater, an electric switch operable by said tiltable member and connected to said circuit in series with said heater, a glass coffee maker comprising an upper and a lower bowl vertically mounted upon the said heater and adjusting means on said support for adjusting the angle of said coffee maker to provide for disposing the weight of said water at one side of the center line of gravity when the said water is in the upper bowl and at the opposite side of the said center line of gravity when the water is in the lower bowl and thereby cause tilting of said tiltable member to operate said switch.

7. A device of the character described for causing the operation of a coffee maker comprising a lower bowl and an upper bowl vertically mounted upon the same, the said device comprising a support for said coffee maker; the said support having a base adapted to support said coffee maker in vertical position thereon, means for tiltably mounting said heater on said base and disposing the same to support said coffee maker at an angle whereby the said heater may be tilted upon the shifting of the weight of a fluid from one of the bowls of said coffee maker to the other, an electric circuit for supplying energy to said heater, an electric switch in said circuit operable by the tilting of said heater to cause the operation of said coffee maker and means on said base for adjusting the angle at which the said heater will support the said coffee maker.

8. A device for demonstrating the operation of a glass coffee maker comprising a lower and an upper bowl by causing continuous operation thereof, said device comprising a support for said coffee maker having a base, a member tiltably mounted thereon, an electric heater mounted upon said tiltable member in laterally fixed position and adapted to support the lower and upper bowl of the said coffee maker in vertical position thereon, an electric supply cord having an attachment plug connectable to said heater, an electric switch in series with said plug and operable by the said tiltable member, the said tiltable member being positioned on said base to support said coffee maker at an angle whereby the weight of a liquid when in the lower bowl will cause the said tiltable member to close said switch and when in the upper bowl will cause the said tiltable member to open said switch.

9. In an automatic device of the character described, the combination of a base, means for adjusting the position of said base, a supporting member pivotally mounted on said base, a heater mounted on said supporting member, a lower bowl mounted upon said heater, an upper bowl mounted upon said lower bowl, the said heater operating to transfer liquid from one of said bowls to the other and thereby causing pivotal movement of said supporting member, and means operated by said supporting member for controlling the operation of said heater.

LOUIS V. LUCIA.